United States Patent
Nicu et al.

(10) Patent No.: US 7,159,460 B2
(45) Date of Patent: Jan. 9, 2007

(54) MICROMACHINED GYROSCOPIC SENSOR WITH DETECTION IN THE PLANE OF THE MACHINED WAFER

(75) Inventors: Liviu Nicu, La Roche de Glun (FR); Claude Rougeot, Lyons (FR); Jérôme Inglese, Guilherand Granges (FR); Bertrand Leverrier, Montelier (FR)

(73) Assignee: Thales, Neuilly sur Seine (FR)

( * ) Notice: Subject to any disclaimer, the term of this patent is extended or adjusted under 35 U.S.C. 154(b) by 8 days.

(21) Appl. No.: 10/531,456

(22) PCT Filed: Nov. 3, 2003

(86) PCT No.: PCT/EP03/50785

§ 371 (c)(1),
(2), (4) Date: Apr. 14, 2005

(87) PCT Pub. No.: WO2004/042324

PCT Pub. Date: May 21, 2004

(65) Prior Publication Data

US 2006/0037396 A1 Feb. 23, 2006

(30) Foreign Application Priority Data

Nov. 5, 2002 (FR) .................................. 02 13835

(51) Int. Cl.
*G01C 19/00* (2006.01)
*G01P 9/00* (2006.01)
(52) U.S. Cl. .................................. 73/504.12; 73/504.14
(58) Field of Classification Search ............. 73/504.02, 73/504.04, 504.12, 504.16, 504.14
See application file for complete search history.

(56) References Cited

U.S. PATENT DOCUMENTS

| 5,604,312 | A | 2/1997 | Lutz |
| 5,728,936 | A | 3/1998 | Lutz |
| 6,009,751 | A | 1/2000 | Ljung |
| 6,705,164 | B1 * | 3/2004 | Willig et al. .............. 73/504.12 |
| 7,051,591 | B1 * | 5/2006 | Chaumet et al. .......... 73/504.12 |
| 2004/0250620 | A1 * | 12/2004 | Nicu et al. ................ 73/504.12 |

FOREIGN PATENT DOCUMENTS

| DE | 44 28 405 A | 2/1996 |
| WO | 02/066929 A | 8/2002 |

* cited by examiner

*Primary Examiner*—Helen Kwok
(74) *Attorney, Agent, or Firm*—Lowe Hauptman & Berner, LLP

(57) ABSTRACT

The invention relates to a microgyroscope, that is to say an inertial micromechanical sensor dedicated to the measurement of angular velocities, which is produced by micromachining techniques on a silicon wafer. The gyroscope comprises two symmetrical moving assemblies coupled via a coupling structure. Each of the two assemblies comprises a moving mass surrounded by a moving intermediate frame. The frame is connected to the coupling structure and can vibrate in two degrees of freedom in orthogonal directions Ox and Oy in the plane of the wafer. The mass is connected on one side to the frame and on the other side to fixed anchoring regions via linking means that allow the vibration movement along the Oy direction to be transmitted to the mass without permitting movement of the mass along the Ox direction. An excitation structure is associated with the frame in order to excite its vibration along Ox. A movement detection structure is associated with the mass in order to detect its vibration along Oy.

11 Claims, 3 Drawing Sheets

MICROMACHINED GYROSCOPIC SENSOR WITH DETECTION IN THE PLANE OF THE MACHINED WAFER

CROSS-REFERENCE TO RELATED APPLICATIONS

The present Application is based on International Application No. PCT/EP2003/050785, filed on Nov. 3, 2003, which in turn corresponds to FR 02/13835 filed on Nov. 5, 2002, and priority is hereby claimed under 35 USC §119 based on these applications. Each of these applications are hereby incorporated by reference in their entirety into the present application.

FIELD OF THE INVENTION

The invention relates to a microgyroscope, that is to say an inertial micromechanical sensor dedicated to the measurement of angular velocities, which is produced by micromachining techniques.

BACKGROUND OF THE INVENTION

The inspiration for micromachining sensors comes from techniques for producing integrated circuits. This consists in producing, collectively on a single thin wafer (in principle a silicon wafer), several tens or hundreds of identical sensors using deposition, doping and photoetching techniques that define not only the electrical parts of the sensor but also the cut-out geometrical features that give the sensor its mechanical properties.

The etching techniques are well controlled and collective fabrication considerably reduces the costs. The robustness of the devices is excellent and the small size of the structures is highly advantageous.

SUMMARY OF THE INVENTION

To produce a microgyroscope, a suspended vibrating mass is formed in a silicon wafer together with an electrical excitation structure for making this mass vibrate in a defined direction. When the gyroscope rotates about an axis called the sensitive axis of the gyroscope, perpendicular to this vibration direction, a coriolis force is exerted on the mass. This coriolis force, which is a vector sum of the vibration movement and the rotation movement, produces a vibration of the mass in a direction perpendicular both to the excitation vibration and to the axis of rotation. This resulting natural vibration is detected by a detection structure, which is itself produced by micromachining.

Structures having two vibrating masses that are mechanically coupled in the manner of a tuning fork have already been produced. The two masses are coplanar and machined in the same silicon wafer.

In general, the sensitive axis of these gyroscopes lies in the plane of the silicon wafer and the detection structure detects any movement perpendicular to the plane of the masses using electrodes placed above each moving mass. The electrical signals resulting from this detection are used to determine an angular velocity of rotation of the gyroscope about its sensitive axis.

However, to produce structures for detecting movements perpendicular to the plane of the moving masses generally requires the gyroscope to comprise several machined wafers, which have to be joined together. One of the wafers includes the actual micromachined vibrating structure with its moving masses, its linking arms and a vibration excitation structure, while at least one other wafer includes electrodes for detecting the vibration generated by the coriolis force. To fabricate the multi-wafer assembly is expensive.

This is why there is also a need to produce technologically simpler structures, machined in a single silicon wafer, in which an excitation movement of the moving mass is generated in a direction Ox in the plane, whereas a movement resulting from the coriolis force is detected in a direction Oy in the same plane, perpendicular to Ox. The sensitive axis of the microgyroscope is in this case an Oz axis perpendicular to the plane of the silicon wafer. The excitation structure and the detection structure are interdigitated capacitive combs produced when machining the silicon wafer. All the electrical structures are produced on the same wafer as the vibrating mechanical structure. Fabrication is therefore much less expensive.

However, in this type of gyroscope it is necessary for the excitation movement along the Ox axis to be well separated from the detection movement along the Oy axis—specifically, this means that the detection structure must detect mainly the movement along Oy that results from the coriolis force, without the measurement being contaminated by parasitic detection of the excitation movement along Ox.

One object of the invention is to propose a microgyroscope structure that allows rotation measurement with a very high sensitivity and very good linearity, but with minimal perturbations due to the excitation movement or to other effects. Another object is to propose a microgyroscope structure that can accommodate, apart from the electrical structures for inducing vibration and for detecting movement, auxiliary electrical structures for adjusting the frequency and for compensating for any bias (an angular velocity measurement not equal to zero when the angular velocity is equal to zero) due to intrinsic defects or to the spread in characteristics resulting from mass production.

According to the invention, what is proposed is a gyroscope with a vibrating structure, produced by micromachining a thin flat wafer, this gyroscope comprising two symmetrical moving assemblies coupled by a coupling structure that connects these two assemblies in order to allow mechanical vibration energy to be transferred between them, this gyroscope being characterized in that each of the two symmetrical moving assemblies comprises two moving elements, an inertial first moving element being connected to the coupling structure and able to vibrate in two degrees of freedom in orthogonal directions Ox and Oy of the plane of the wafer, and a second moving element being connected, on one side, to the first element and, on the other side, to fixed anchoring regions via linking means that allow the vibration movement of the first element in the Oy direction to be transmitted to the second element without permitting any movement of this second element in the Ox direction, an excitation structure being associated with the inertial first moving element in order to excite a vibration of this element along Ox, and a movement detection structure being associated with the second moving element in order to detect a vibration of the second element along Oy, the first moving element being a rectangular intermediate frame surrounding the second moving element, denoted by the name moving mass, and the coupling structure comprising two outer frames, each of which surrounds the intermediate frame of a respective moving assembly.

In other words, the first moving element is excited into movement along Ox but it does not cause the second element to move in this direction. The first element experiences the coriolis force along Oy (when the microgyroscope is rotating about a sensitive axis Oz perpendicular to Ox and Oy) and causes the second element to move in this direction thanks to the linking means between these two elements. The coupling structure allows the vibration energy of one of the symmetrical structures to be transferred to the other, and vice versa, both for the vibratory movement along Ox and for the vibratory movement along Oy, since the coupling structure is connected to that one of the two moving elements that vibrates both along Ox and along Oy.

In what follows, the coupling structure will therefore be referred to as the "outer frame", the first moving element will be referred to as the "intermediate frame" or the "inertial intermediate frame", and the second moving element will be referred to as the "moving mass", this mass being surrounded by the inertial intermediate frame.

The gyroscope according to the invention, produced by micromachining a thin flat wafer (preferably a silicon wafer), therefore preferably comprises, in the plane of the wafer, moving elements and anchoring regions, the moving elements comprising two flat moving masses, a flat moving intermediate frame around each mass, and a coupling structure that connects the two moving intermediate frames in order to allow mechanical energy to be transferred between the two intermediate frames, an excitation structure associated with each moving intermediate frame in order to excite vibration of the frame in the Ox direction in the plane of the wafer, and a detection structure associated with each moving mass, for detecting a movement of the mass in the Oy direction perpendicular to Ox and in the plane of the wafer. The mass is connected to the intermediate frame that surrounds it via at least two (preferably four) first narrow and elongate flexure arms that exhibit high stiffness (resistance to elongation) in the Oy direction and low stiffness (resistance to flexure) in the Ox direction (in practice, they lie mainly in the Oy direction and cannot stretch in this direction, whereas they can flex in the Ox direction). The mass is also connected to an anchoring region via at least two (preferably four) second narrow and elongate flexure arms that exhibit high stiffness (resistance to elongation) in the Ox direction and low stiffness (resistance to flexure) in the Oy direction (in practice, they lie mainly in the Ox direction and cannot stretch in this direction, whereas they can flex in the Oy direction).

To obtain both high stiffness or resistance to elongation in one direction and low stiffness in the direction perpendicular in the same plane, all that is required is for the arms to have an overall length of at least five times their width. These refer to relative stiffnesses, the absolute stiffness depending of course on the absolute dimensions of the arms.

Preferably, each first flexure arm is bent over in the form of a U and has two elongate portions extending along the Oy direction, these two portions being connected by a short linking element. In this case, it is desirable to connect the short linking element of one of the first arms to the similar linking element of another first flexure arm, via a crosspiece elongated in the Ox direction, this crosspiece preventing asymmetric forces from being exerted on these two first flexure arms.

The structures for exciting the moving frames and the structures for detecting the movement of the moving mass are preferably capacitive combs comprising interdigitated electrodes. The fixed portion of a comb is attached to an anchoring region, which also forms an electrical contact for transmitting electrical signals to this fixed portion or from this fixed portion. The moving portion is attached to a moving element, the intermediate frame for the excitation structure or the moving mass for the detection structure. The anchoring region or regions of the moving mass form (or forms) an electrical contact on the moving portion of the comb, through the entire vibrating structure.

An additional interdigitated comb structure may be provided on the moving mass in order to adjust, by applying an adjustable DC voltage between the facing electrodes of the comb, the apparent stiffness of the second flexure arms in the Oy direction for the purpose of controlling the natural resonant frequency of the structure. The apparent stiffness is adjusted by introducing a negative electrostatic stiffness that is added to the natural (positive) stiffness of the flexure arms.

Another interdigitated comb structure may be provided in order to exert a torque on the moving mass about an axis parallel to Oz. This structure preferably comprises at least two combs in order to exert a torque in a controlled direction and of controlled value. Said structure serves to compensate for the phase quadrature bias encountered when deviations from symmetry of the vibrating structure are generated as a result of imperfect fabrication of the microgyroscope. We will return to this point later on.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description therof are regarded as illustrative in nature, and not as restrictive.

BRIEF DESCRIPTION OF THE DRAWINGS

Other features and advantages of the invention will become apparent on reading the detailed description that follows, which is given with reference to the appended drawings in which.

DETAILED DESCRIPTION OF THE INVENTION

Figure 1:
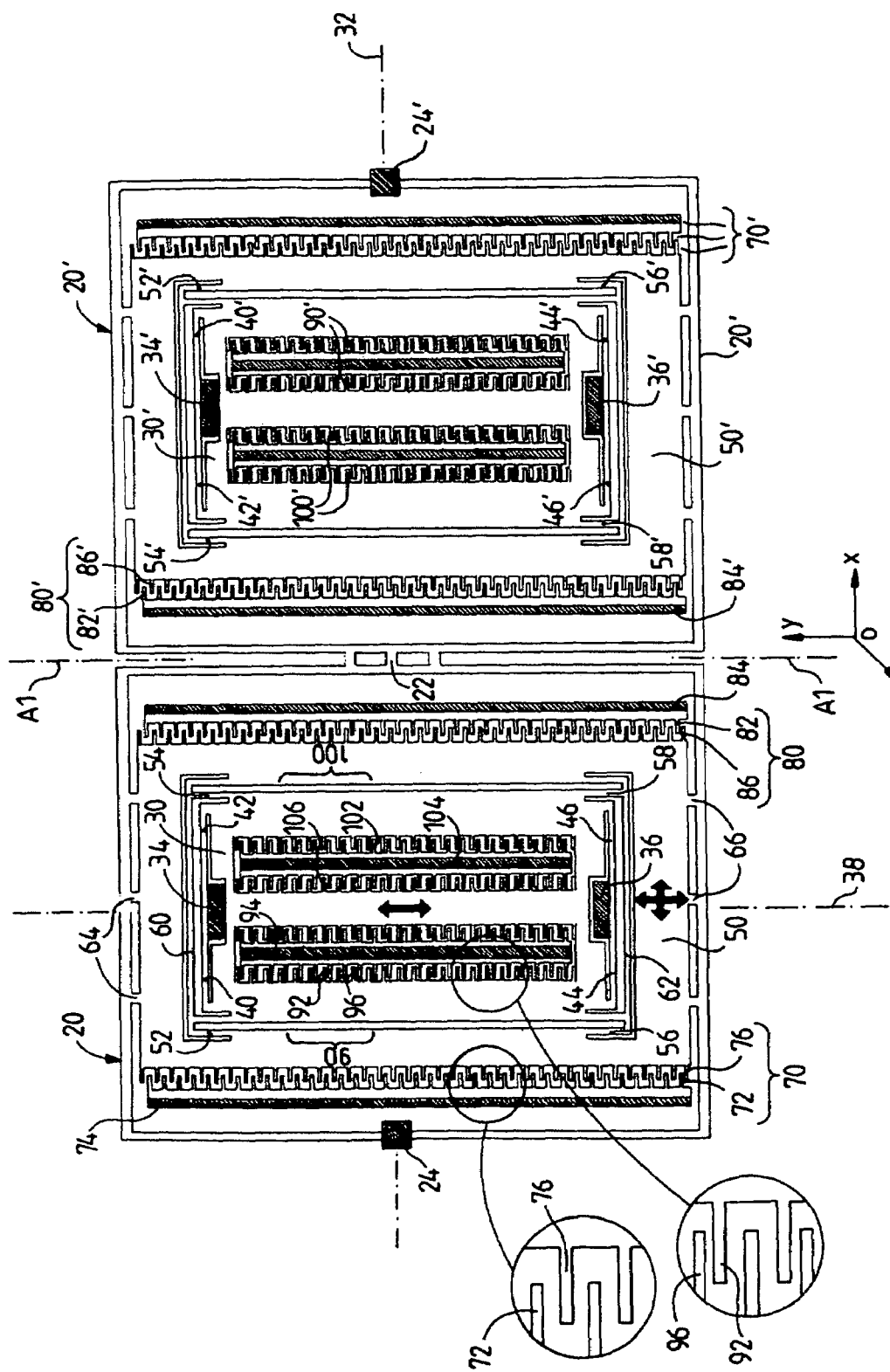
FIG. 1 shows a top view of the general structure of the micromachined gyroscope according to the invention.

FIG. 1 shows the thin flat silicon wafer machined according to the invention in order to make a gyroscope whose sensitive axis is perpendicular to the plane of the wafer (which is the plane of the figure).

Silicon is chosen as preferred material, firstly for its mechanical properties and secondly for its high conductivity when it is doped sufficiently with an appropriate impurity (boron in general in the case of p-type silicon). Conductive silicon allows the electrical functions of the gyroscope, and especially the excitation and detection functions, to be carried out. These functions are carried out by interdigitated capacitive combs supplied with electrical current or voltage. The fingers of these combs, machined directly in the conductive silicon, serve as the plates of capacitors useful for the excitation and detection functions.

The thickness of the starting silicon wafer is a few hundred microns. The wafer has, on the one hand, fixed anchoring zones formed in this thickness and, on the other hand, the actual vibrating structure, which is free relative to the anchoring regions and is formed over a smaller thickness, for example over a thickness of around sixty microns, and is isolated from the rest of the thickness of the wafer by a narrow gap. The silicon wafer is cut by micromachining, over this approximately sixty-micron thickness, into the moving mass features, the moving frame, the coupling structure, the flexure arms and the interdigitated combs that are desired.

The structure may be machined using, as starting substrate, a silicon-on-insulator substrate, but other methods are also possible. A silicon-on-insulator substrate consists of a silicon substrate a few hundred microns in thickness that carries, on its front face, a thin layer of silicon oxide which is itself covered with a layer of single-crystal silicon a few tens of microns in thickness. The machining operation consists in etching the silicon of the substrate via its front face, into the desired surface features, by means of photo-etching techniques commonly used in microelectronics, down to the oxide layer, with a selective etchant that etches the silicon without significantly etching the oxide. The etching is stopped when the oxide layer is bared. This oxide layer is then removed by selective etching using another etchant so as to leave only the surface layer of single-crystal silicon, except in the anchoring regions where the oxide layer remains and forms a strong bond between the substrate and the surface layer of single-crystal silicon. Machining via the front face defines the various cutting operations for the moving parts. These are therefore the above surface features, anchoring regions and cutting operations for the moving parts, as will be seen in the figures.

The general structure of the gyroscope is a structure of the tuning fork type, that is to say a symmetrical structure comprising two moving inertial assemblies vibrating in phase opposition, these moving assemblies being connected together via a coupling structure serving to transmit, without any loss, from one assembly to the other, the mechanical vibration energies of the two assemblies in order to render these vibrations in phase opposition. The symmetry of the structure is a symmetry with respect to an axis Al, with one moving assembly on each side of this axis.

The coupling structure is formed by two rectangular outer frames 20 and 20' within which the moving inertial assemblies are located. The frames 20 and 20' are connected together via a short linking bar 22, which may be regarded as being rigid. The linking bar 22 links the middle of one side of the first frame to the middle of an adjacent side of the second frame. It constitutes a center of symmetry of the entire structure and it is perpendicular to the axis Al and centered on this axis. The short linking bar 22 may be reinforced by two other short linking bars located on either side of the bar 22 and also centered on the axis Al. These other short bars, of greater or lesser distance from the bar 22, allow the difference between the useful excitation and detection frequencies of the microgyroscope to be adjusted (the detection frequency preferably being slightly different from the excitation frequency, and the frequency difference representing the bandwidth of the gyroscope).

The outer frames 20 and 20' of the coupling structure surround the two moving assemblies, in principle over at least three sides, and they are connected to these two assemblies preferably along sides perpendicular to the general axis of symmetry Al. The frames 20 and 20' may (optionally) each be attached to an anchoring region 24, 24' located in the middle of one side opposite the side connected to the linking bar 22. In this case, the frames 20 and 20' each completely surround a respective inertial moving assembly. The central linking bar 22 and the other sides of the frames 20 and 20' are not connected to fixed anchoring regions.

The interdigitated combs serving to make the inertial assemblies vibrate and to detect the movement resulting from the coriolis force are also themselves placed inside each of the outer frames 20 and 20'. In what follows, only the elements located inside the frame 20 will be described, the structure for the other frame 20' being strictly identical. The elements internal to the frame 20' are denoted by the same references as those of the frame 20, but with the addition of the "prime" suffix.

Each inertial assembly comprises a central moving inertial mass 30 and an intermediate inertial frame 50 that surrounds it and that is therefore located between the mass 30 and the outer frame 20.

The moving mass 30 can move only in the Oy direction (vertical axis in the plane of the figure). The intermediate frame 50 can move along the Oy axis and along the Ox axis perpendicular to Oy and also lying in the plane of the figure. The sensitive axis of the gyroscope is the Oz axis perpendicular to the plane of the wafer. A vibration of the inertial intermediate frame is excited in the Ox direction. When the gyroscope rotates about its sensitive axis Oz, the intermediate frame is made to vibrate along the Oy axis. This vibration along Oy is transmitted to the mass 30, whereas the vibration along Ox is not transmitted. As will be seen, a vibration excitation structure is associated with the intermediate frame 50 and a vibration detection structure is associated with the inertial mass 30. The coupling structure, formed by the frames 20, 20' and the bar 22 which connects them, transmits the mechanical vibration energy from the moving inertial assembly on one side of the axis Al to the other, both for vibrations along Ox and vibrations along Oy as this coupling structure is connected directly to the intermediate frames that may vibrate both along Ox and along Oy.

The moving mass 30 is connected to fixed anchoring regions via at least two flexure arms designed to permit the mass to move along Oy but to prevent any significant movement of the mass in the Ox direction. These arms are preferably located on either side of an axis of symmetry 32 of the mass, parallel to Ox. There are therefore two anchoring regions 34 and 36 located on either side of the moving mass, these being symmetrical with respect to this axis of symmetry 32. In addition, these regions are preferably located on another axis of symmetry 38 of the mass, which axis is parallel to Oy. The flexure arms that connect the mass 30 to the regions 34 and 36 are arms elongated in the Ox direction so as to have a high stiffness (a high resistance to elongation) in that direction. They are also very narrow, compared to their length, so as to have a low stiffness in the Oy direction perpendicular to Ox. This low stiffness allows the mass to move along Oy. There are preferably four flexure arms rather than two, the mass being connected to the anchoring region 34 via two arms 40 and 42 in line with each other and on either side of the region 34. The mass is also connected to the second anchoring region 36 via two arms 44 and 46 in line with each other and on either side of the region 36.

In practice, as may be seen in FIG. 1, to save space in the Oy direction without significantly reducing the length of the mass in that direction, a cut is made in the mass around the anchoring zone. To maximize the flexibility of the flexure arms in the Oy direction by increasing the ratio of the length to the width of these arms, each arm is connected on one side to a point near an end corner of the mass (the mass has in principle, a generally rectangular shape) and on the other side to the anchoring region located on the axis of symmetry 38. It should be noted that it would also be possible to envisage giving the arms 40, 42, 44, 46 a folded-over shape with two branches elongated in the Oy direction, the arms then being attached to the mass closest to the central anchoring region.

It should also be noted that, rather than one central anchoring region located in the middle of one side of the moving mass, there could be two anchoring regions located more toward the end corners of the mass on either side of the axis 38.

The moving intermediate frame 50 completely surrounds the mass 30. The mass 30 is connected to the intermediate frame 50 via at least two flexure arms that have the particular feature of having a very high stiffness (very high resistance to elongation) in the Oy direction and a low stiffness in the Ox direction. These arms are elongated in the Oy direction and have a small width compared to their length, so as to exhibit this stiffness difference.

There are preferably four flexure arms of this type between the mass 30 and the intermediate frame 50, the arms being each located in practice at a corner of the moving mass if the latter is of generally rectangular shape. They are placed symmetrically on one side of the axis of symmetry 32 of the mass (the axis parallel to Ox) and on the other side of the axis of symmetry 38 (parallel to Oy).

These arms are denoted by the references 52, 54, 56 and 58 and they preferably have a shape folded over in the form of a U in order to reduce their longitudinal dimension by a factor of two without significantly reducing their useful length, and therefore without significantly reducing the high ratio of their stiffness along Oy to their stiffness along Ox. The two U-shaped folded over branches are elongated parallel to Oy and are connected together via a short linking element. However, it would be possible for the arms 52 to 58 not to be folded over but to lie completely along the Oy direction between the intermediate frame and the mass. By folding them over it is possible to save space without significantly modifying the desired mechanical characteristics.

If the arms are folded over as in FIG. 1, it is preferable for the short linking element (which connects the two branches of the U) of a first arm 52 to also be connected to the corresponding short element of the arm 54 which is symmetrical with the arm 52 with respect to the axis 38. A crosspiece 60 is provided for this purpose, parallel to Ox, in order to connect the bottom of the U of the linking arm 52 to the bottom of the U of the flexure arm 54, the arms 52 and 54 being symmetrical with respect to the axis 38. A similar crosspiece 62, symmetrical with the crosspiece 60 with respect to the axis 32, connect the symmetrical elements 56 and 58. These crosspieces 60 and 62, parallel to Ox, reinforce the symmetry of transmission of movement along Oy, imposed by the moving intermediate frame 50, to the mass 30. They are not present if the arms 52, 54, 56 and 58 do not have a folded-over shape as in this case the ends of the arms 52 and 54 could already be rigidly connected via the intermediate frame 50 itself.

As may be seen in FIG. 1, the elongate U-shaped folded-over form of the flexure arms between the moving frame 50 and the moving mass 30 is obtained by cutting into the moving frame and into the moving mass, but in general the flexure arms start approximately from an internal corner of the intermediate frame toward a facing corner of the mass, even if the effective point of attachment of the arm on the frame or on the mass is not exactly from this corner. The mass may be considered as being overall suspended via its four corners to the moving frame.

The moving intermediate frame 50, surrounded by the outer frame 20 of the coupling structure, is connected to this outer frame via short linking arms 64 on one side and short linking arms 66 on the other, the arms 64 being symmetrical to the arms 66 with respect to the axis of symmetry 32. The arms 64, like the arms 66, are distributed along one side of the frame 50, this side being parallel to the Ox axis. These short arms constitute practically rigid links through which the energy of vibration of Ox and Oy of the intermediate frame 50 (and of the moving mass 30) can pass into the coupling structure and therefore into the second intermediate frame 50' and the second moving mass 30'. In the example shown, three short arms 64 are distributed along the side of the intermediate frame 50, three other short arms 66 are distributed along the opposite side.

There is no linking arm between the intermediate frame and the outer coupling frame along the sides parallel to the Oy axis.

The intermediate frame 50 is excited in vibration along Ox by a first structure in the form of an interdigitated comb 70 that comprises a fixed half-comb 72 attached to an anchoring region 74, and a moving half-comb 76 formed along a first side (parallel to Oy) of the intermediate frame 50. The teeth or fingers of the fixed half-comb 72, made of conductive silicon machined at the same time as the other elements of the gyroscope, constitute the first plate of a capacitor and the teeth or fingers of the moving half-comb 76, also made of conductive silicon, constitute the second plate of this capacitor. Conventionally, the comb structure acts as an exciter, for exciting the movement of the moving portion thanks to the attractive forces that are exerted between the facing fingers when a voltage is applied between the half-combs. The excitation voltage is an AC voltage in order to generate a vibration movement, and the frequency of this voltage is chosen to be close to the mechanical resonance frequency of the structure. The excitation voltage is applied between the anchoring region 74 and one and/or the other of the anchoring regions 34 and 36. The fixed half-comb 72 is in direct electrical contact (via the conductive silicon substrate) with the anchoring region 74. The moving half-comb 76 is in contact with the anchoring regions 34 and 36 via the flexure arms 52 to 58, of the body of the moving mass, via the flexure arms 40 to 46 and via the intermediate frame 50, so that, when a voltage is applied between the anchoring region 74 and the anchoring regions 34 or 36, a voltage is applied between the fixed portion and the moving portion of the comb 70.

The excitation movement generated in the intermediate frame 50 is along the Ox direction, the combs acting by modifying the mutual area of overlap of the intercalated fingers.

The microgyroscope preferably includes another interdigitated comb structure associated with the intermediate frame, symmetrical with the structure 70 with respect to the axis 38. It comprises a fixed half-comb 82, attached to an anchoring region 84, and a moving half-comb 86 machined along one side of the intermediate frame 50. This structure may serve as a detector for detecting the movement of the frame along Ox. It is useful for servocontrol of the movement excited by the comb 70. In general, servocontrol is useful for adjusting the excitation frequency with respect to the resonant frequency of the structure. The voltages detected by the structure 80 appear between the anchoring region 84 and the anchoring regions 34 and 36 (or else the region 24).

At least one interdigitated comb is associated with the moving mass 30 in order to detect the movement of the moving mass in the direction Oy. The orientation of these combs depends on the principle on which the detection is based. If the detection is based on a measurement of the changes in mutual overlap area between the fingers of the fixed and moving half-combs, the comb for detecting the movement along Oy is placed perpendicular to the excitation comb 70 (which also is based on changes in overlap area). If the detection is however based on measuring the changes in spacing between the fingers of the fixed half-comb and the moving half-comb, the detection comb is placed parallel to the excitation comb. Detection by the change in spacing between fingers is preferred as it is more sensitive. The interdigitation of the combs is then asymmetric at rest, the fingers of one half-comb not being exactly in the middle of the gap between two fingers of the other half-comb, whereas a comb operating, (like the excitation comb) on the basis of changes in overlap area has the fingers of one half-comb in the middle of the gap between the fingers of the other half-comb.

This is the case shown in FIG. 1, in which the detection combs are placed in the same general orientation as the combs 70 and 80, although they are associated with a movement along Oy while the combs 70 and 80 are associated with a movement (excitation or detection movement) along Ox.

In the example shown in FIG. 1, the moving mass is associated with two identical interdigitated combs 90 and 100 placed parallel to the axis of symmetry 38 and on either side of this axis. These combs act in the same way, by detecting the movement of the mass along Oy, but as a variant it will be possible to be limited to just a single comb placed at the center of the mass along the axis 38.

The comb 90 comprises a fixed half-comb 92 attached to an anchoring region 94 and a moving half-comb 96 forming part of the moving mass itself. The moving mass includes a cut-out for leaving space for the fixed comb 92 and for the anchoring region 94, and the edges of this cut-out are cut in the form of fingers in order to constitute the moving half-comb 96 in which the fingers of the fixed half-comb are intercalated. In the example shown, the comb 90 is a double comb, that is to say two sides of the cut-out in the mass 30 are provided with fingers, and the fixed half-comb 92 has fingers on either side of the anchoring region 94.

The interdigitated structure 100 is strictly symmetrical with the structure 90 and is formed in another cut-out in the moving mass 30. It comprises a fixed half-comb 102, an anchoring region 104 and a moving half-comb 106.

In order to detect the movement along Oy, an electronic circuit associated with this structure detects the frequency modulation of the electrical voltages present between the anchoring region 94 and the anchoring regions 34 and 36, and/or between the region 104 and the regions 34 and 36. This modulation is due only to a movement of the moving mass along the Oy axis, since the mass can only move along this axis.

Figure 2:
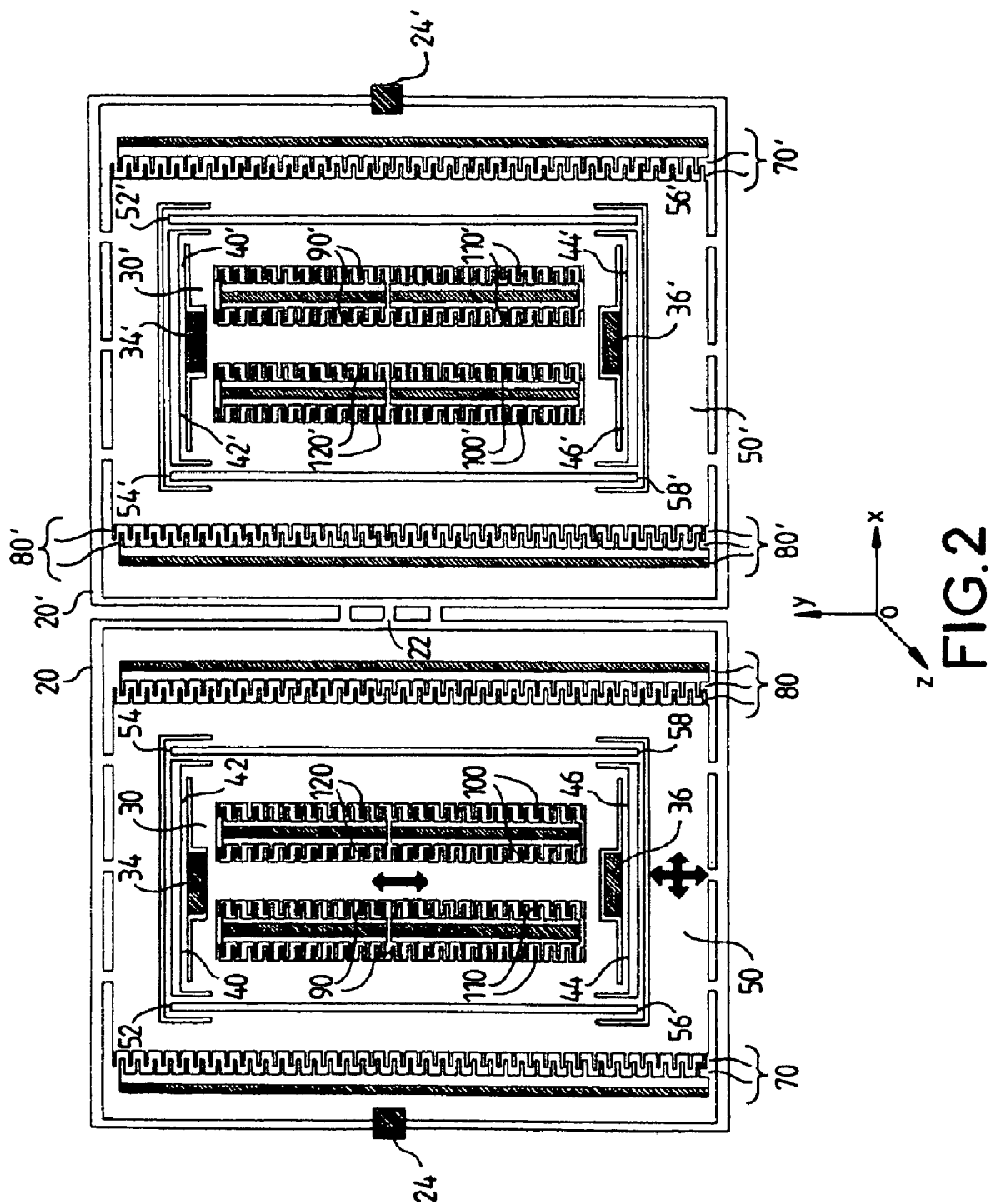
FIG. 2 shows a variant of the structure, which additionally includes a means of adjusting the vibration frequency of the moving mass by varying the stiffness of the flexure arms.

FIG. 2 shows an improvement of FIG. 1. At least one additional interdigitated comb associated with the moving mass has been provided. This comb allows the apparent stiffness of the flexure arms 40, 42, 44, 46 to be electrically adjusted, by simply controlling the DC voltage, this stiffness adjustment having a direct consequence on the adjustment of the natural vibration frequency along Oy in the presence of a coriolis force. This is because the natural mechanical resonance of the moving assemblies depends on the stiffness of the flexure arms that oppose the vibration movement generated. By adjusting the stiffness, and therefore the frequency, it is possible to compensate for the variations in resonant frequency that might result from non-uniformities or defects in fabrication. Any deviation between the actual frequency and the intended theoretical frequency may thus be compensated for.

With a comb supplied with DC voltage, and acting on the moving mass 30 in order to exert a constant force in the Oy direction, it is possible to exert, at rest, a stress on the flexure arms 40, 42, 44, 46. This stress tends to create a negative stiffness, of electrostatic origin, the absolute value of which is subtracted from the natural stiffness of these arms in the Oy direction.

The comb exerting this stress is a comb 110 oriented like the other combs (along the general direction of Oy), and in this case it acts by changing spacing between fingers of the half-combs (a comb with offset fingers). A single central comb may suffice, but in the example shown in FIG. 2 two symmetrical combs (110 and 120) placed laterally on either side of the axis 38 have been provided. In the example shown, these combs are symmetrical with respect to the center of symmetry of the moving mass and the detection combs 90 and 100 are also symmetrical with respect to this center, rather than with respect to the axis 38, but the symmetry could be with respect to the axis 38 both for the combs 90 and 100 and for the combs 110 and 120. The stiffness adjusting comb 110 is located along the extension of the detection comb 90. It comprises a fixed half-comb, an autonomous anchoring region (for an autonomous electrical supply) and a moving half-comb, again consisting of fingers directly cut into the moving mass. The comb 120 is identical to the comb 110.

Figure 3:
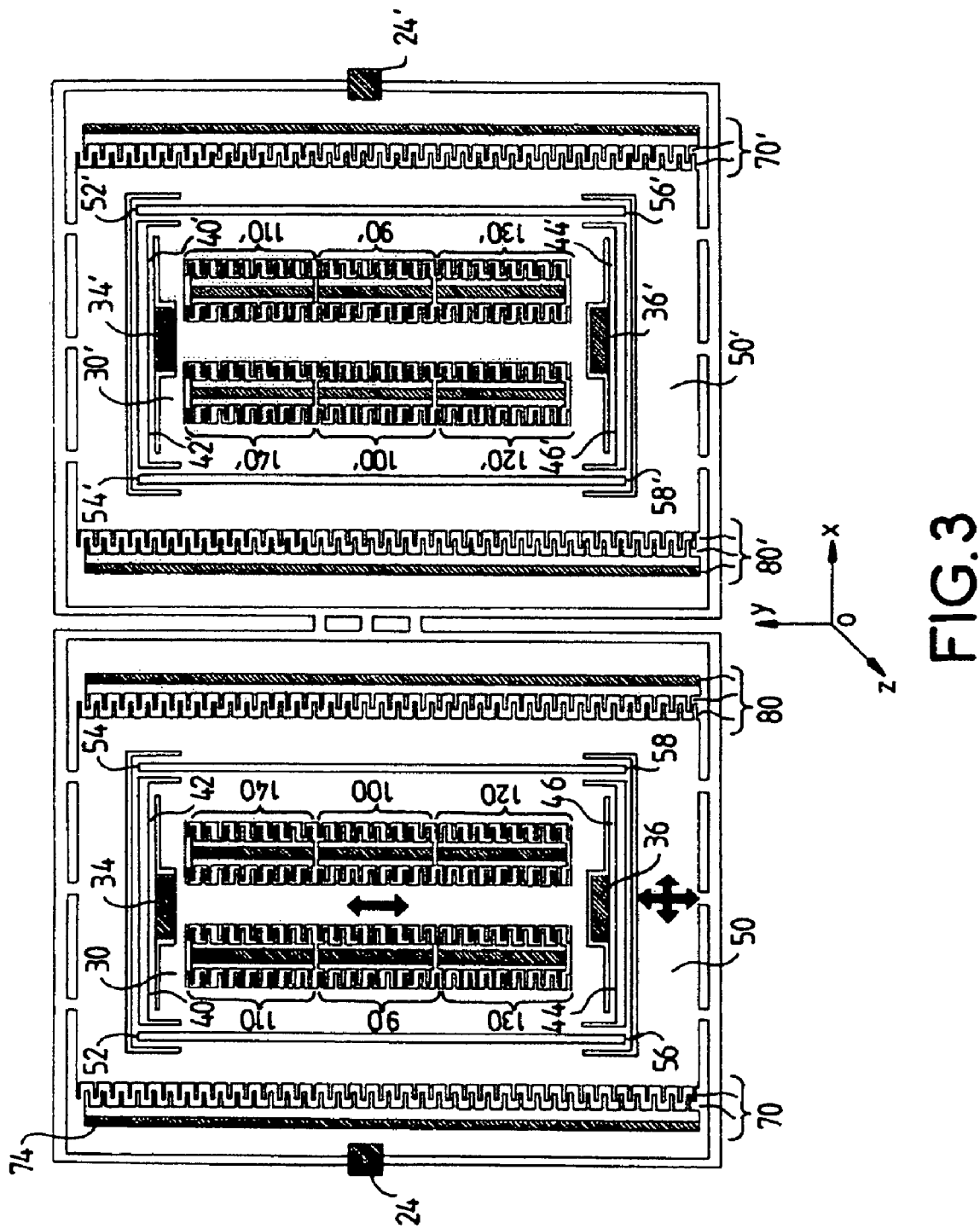
FIG. 3 shows another variant of the structure, which additionally includes a means for compensating for any phase quadrature bias by adding a torsional prestress in one direction, which tends to reduce the bias.

Further improvement with other combs again associated with the moving mass is shown in FIG. 3. These combs have, here too, been designed, merely by way of example, to lie along the extension of the combs 90 and 100 (which are then shorter than those in FIG. 1 or even those shown in FIG. 2). The additional combs are intended to exert, by application of suitable DC voltages to each of them, a force that twists the moving mass about its center of symmetry. This has the effect of modifying the orientation of the excitation movement with respect to the detection movement and of consequently modifying (in a direction tending to compensate for it) the quadrature bias of the gyroscope.

The gyroscope bias is the non-zero signal value measured when the angular velocity of rotation of the gyroscope is zero. The quadrature bias results from movements along one axis, whereas a force is in fact exerted on a perpendicular axis. This results from defects in the rectangularity of the beam sections or of other asymmetry factors. This bias may be partly compensated for by exerting a certain torsion on the moving mass. This torsion is exerted for example by acting on two interdigitated combs 130 and 140 that are located diagonally on either side of a center of symmetry of the moving mass 30. A DC voltage is applied to each comb so as to exert a torque in the direction appropriate for compensating for the bias. The torque exists whenever the combs exert forces applied at different points and the directions of which do not pass through the center of symmetry of the mass.

In the example shown in FIG. 3, two combs 130 and 140 have been provided for exerting this torque, in addition to the detection combs 90 and 100 and the frequency adjusting combs 110 and 120. However, a single comb 130 would suffice provided that this comb exerts a force in a direction that does not pass through the center of symmetry of the moving mass. It will also be understood that the combs 110 and 120, placed diagonally on the moving mass and exerting forces in directions that do not pass through the center of symmetry of the mass could serve both for adjusting the frequency and exerting the bias compensating torque. In this case, there is no need for the additional combs 130 and 140 since the forces exerted on the mass by the combs 110 and 120 are directed one upward in the figure and the other downward in the figure (it will be assumed here that the combs are asymmetrically interdigitated and that they act on the spacing between the fingers rather than on the overlap of the fingers). Applying voltages of different amplitude to the combs 110 and 120 creates both a torque and a resulting upward or downward force, the latter creating the desired negative stiffness. However, for reasons of symmetry and independence of the stiffness control and the torsion control, a configuration such as that in FIG. 3 with combs 110 and 120 specifically for stiffness adjustment and combs 130 and 140 specifically for quadrature bias compensation will be preferred.

In the foregoing text, provision was made for the combs 90 to 140 to be placed in cut-outs in the moving mass, but it would also be possible to envisage them being placed along the edges of the moving mass without modifying the principles which were explained above.

Thus, a microgyroscope has been described that can be easily produced from a silicon wafer in the plane of which was machined both two moving inertial assemblies and a mechanical coupling structure that surrounds them, and in which each moving assembly was produced in the form of two parts, namely a moving mass and a moving frame, the moving frame being connected to the coupling structure via rigid links and the moving mass being connected to the frame, on one side, and to anchoring points, on the other, via flexure arms that allow movement in the plane in only one degree of freedom for the moving mass and in two degrees of freedom for the frame. The two moving assemblies are mechanically coupled both for excitation vibrations and for orthogonal vibrations resulting from the coriolis force. The mechanical coupling does not take place via flexible flexure arms but directly via rigid links between the moving frame and the coupling structure (unlike in structures in which the coupling between moving assemblies takes place via flexure arms serving both for providing suspension flexibility of the inertial assemblies and the coupling between the two assemblies).

The gyroscope according to the invention may have very high quality factors both in excitation and in detection, thereby allowing the sensitivity of the gyroscope to be increased when identical excitation and detection frequencies are used.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

The invention claimed is:

1. A gyroscope with a vibrating structure, produced by micromachining a thin flat wafer, comprising:
two symmetrical moving assemblies coupled by a coupling structure that connects the two assemblies in order to allow mechanical vibration energy to be transferred between the two moving assemblies, wherein each of the two symmetrical moving assemblies comprises two moving elements, an inertial first moving element being connected to the coupling structure and able to vibrate in two degrees of freedom in orthogonal directions Ox and Oy of the plane of the wafer, and a second moving element being connected, on one side, to the first element and, on the other side, to fixed anchoring regions via linking means that allow the vibration movement of the first element in the Oy direction to be transmitted to the second element without permitting any movement of the second element in the Ox direction, an excitation structure being associated with the first moving element in order to excite a vibration of the first element along Ox, and a movement detection structure being associated with the second moving element in order to detect a vibration of the second element along Oy, the first moving element being a rectangular intermediate frame surrounding the second moving element, denoted by a moving mass, and the coupling structure comprising two outer frames, each of which surrounds the intermediate frame of a respective moving assembly.

2. The gyroscope as claimed in claim 1, wherein the moving mass is connected to the intermediate frame via at least two first narrow and elongate flexure arms that exhibit high resistance to elongation in the Oy direction and low stiffness in the Ox direction, and the moving mass is connected to at least one anchoring region via at least two second narrow and elongate flexure arms that exhibit high resistance to elongation in the Ox direction and low stiffness in the Oy direction.

3. The gyroscope as claimed in claim 2, wherein each first flexure arm is bent over in a form of a U and has two elongate portions extending along the Oy direction, the two portions being connected by a short linking element.

4. The gyroscope as claimed in claim 3, wherein the short linking element of one of the first arms is connected to a similar linking element of another first arm via a crosspiece elongated in the Ox direction.

5. The gyroscope as claimed in claim 1, wherein the coupling structure is connected to the first moving element of each assembly via short rigid links.

6. The gyroscope as claimed in claim 1, wherein the coupling structure comprises, around each moving assembly, an outer frame and a short linking bar between the outer frames.

7. The gyroscope as claimed in claim 1, wherein the structure for exciting the first moving element is a capacitive comb with interdigitated electrodes, which is machined in a thin flat wafer.

8. The gyroscope as claimed in claim 1, wherein the structure for detecting movement of the second moving element is a capacitive comb with interdigitated electrodes, which is machined in a thin flat wafer.

9. The gyroscope as claimed in claim 1, wherein it includes at least one interdigitated associated with the second moving element of each assembly, for detecting the movement of the latter along Oy, and at least one additional interdigitated comb, electrically separated from the first comb, for exerting an adjustable force on the second moving element by applying an adjustable voltage to the additional comb, allowing the natural resonant frequency of the moving assembly to be modified.

10. The gyroscope as claimed in claim 1, wherein the gyroscope includes at least one interdigitated comb associated with the second moving element of each assembly, for detecting the movement of the latter along Oy, and at least one additional interdigitated comb associated with the second moving element of each assembly, in order to exert, by applying an adjustable voltage to the additional comb, an adjustable torque on the second moving element about an axis Oz perpendicular to Ox and Oy.

11. The gyroscope as claimed in claim 1, wherein the gyroscope includes at least three interdigitated combs associated with the second moving element, the first one for detecting a movement of the second moving assembly along Oy, the second one for adjusting a detection frequency and the third one for exerting an adjustable torque on the second moving element.

* * * * *